June 2, 1970  D. M. ABBE  3,515,373
FENCE TRIM GUARD
Filed Feb. 19, 1969
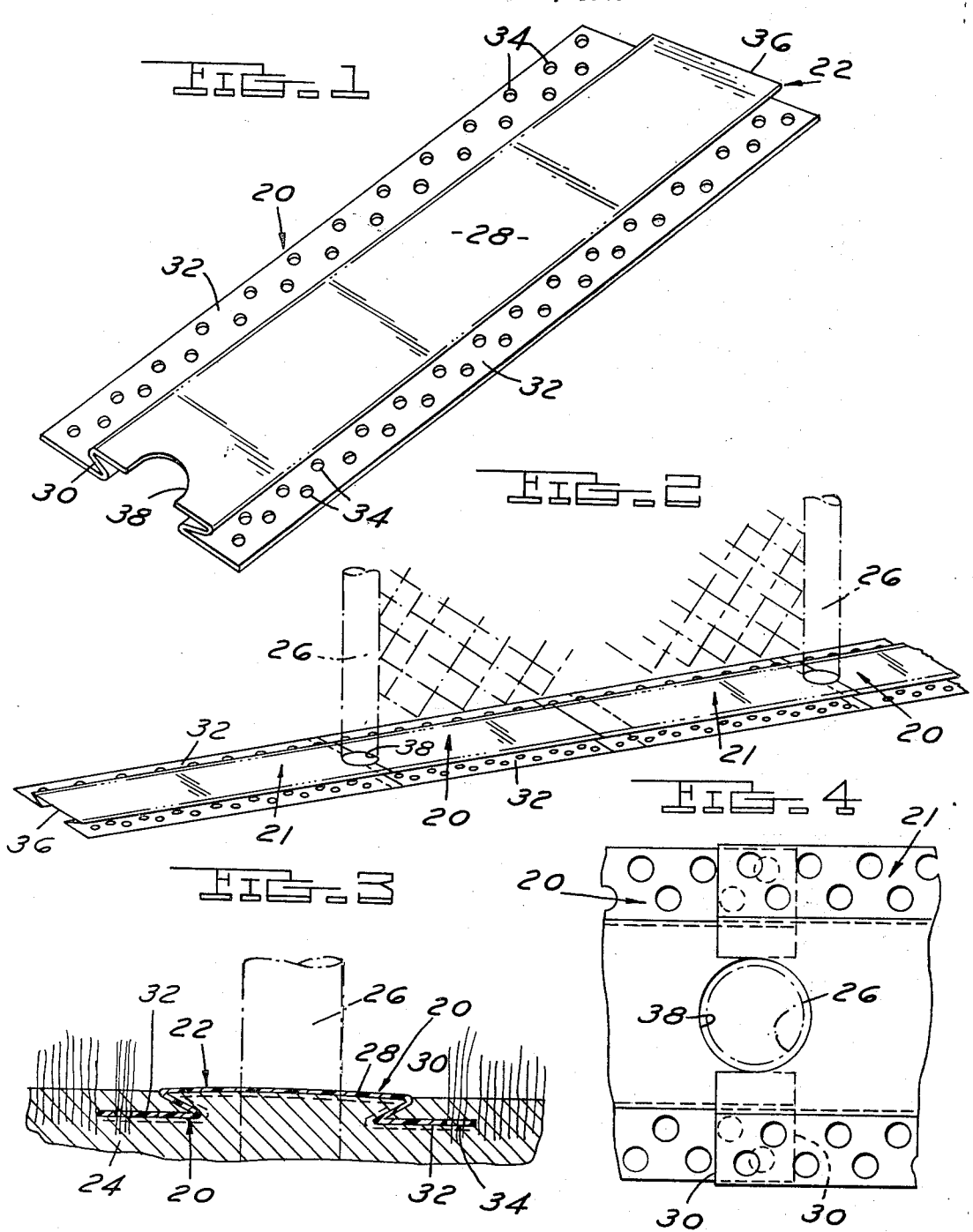
INVENTOR
DOLORES M. ABBE
BY
*Burton & Parker*
ATTORNEYS United States Patent Office 3,515,373
Patented June 2, 1970

3,515,373
FENCE TRIM GUARD
Dolores M. Abbe, 3620 State Road,
Port Huron, Mich. 48060
Filed Feb. 19, 1969, Ser. No. 800,543
Int. Cl. E04h *17/14*
U.S. Cl. 256—32                              9 Claims

ABSTRACT OF THE DISCLOSURE

A fence trim guard including a pair of axially aligned telescopically interlocking guard members adapted to overlie the ground beneath the fence, between the fence posts. Each guard member includes an imperforate longitudinal channel portion which overlies the ground and prevents the growth of vegetation therebeneath, and opposed outwardly extending perforated lateral flange portions which are received beneath the ground to anchor the channel portion in position.

PRIOR ART

The growth of vegetation adjacent to and directly beneath fences has long posed a problem, because of the difficulty in keeping this vegetation trimmed. Conventional lawn and power mowers are not designed to cut grass and weeds in this area, and therefore this vegetation must be trimmed by hand. A vegetation restricting device was suggested in U.S. Pat. No. 2,826,393, however to the best of my knowledge this device has never been commercialized. The device includes a plurality of interlocking hollow concrete members partially buried in the ground beneath the fence. The interlocking ends of the hollow members had to be individually formed, and concrete was apparently utilized for the members to insure that the device remained in position. It is an object of my invention to substantially reduce the cost of such a device, and simplify the installation.

SUMMARY OF THE INVENTION

The fence trim guard of my invention includes a guard member having a substantially imperforate longitudinal channel portion which overlies the ground beneath the fence and prevents the growth of grass, weeds or other vegetation directly beneath and adjacent to the fence. The upper portion of the channel may be flat, to lie flush with the ground, and permit the wheel of the lawn mower to override the channel and cut the grass adjacent the channel. The opposed lateral edges of the channel portion are disposed downwardly, and terminate in outwardly extending lateral flange portions received beneath the ground to anchor the channel portion in position.

The lateral edges of the channel may extend inwardly at an angle toward the axis of the longitudinal channel, to add rigidity to the channel and provide flexibility to the lateral flange portions. The lateral flange portions preferably including a plurality of spaced apertures permitting the growth of grass therethrough.

The preferred embodiment of the fence trim guard of this invention includes pairs of axially aligned, telescopically interlocking guard members, which are telescopically adjustable to vary the combined length to the distance between adjacent fence posts. In this embodiment, the opposed ends of the guard member are provided with a slot which receives the adjacent fence posts; the adjacent guard members may also slightly overlap at the posts. The fence trim guard of my invention need only be positioned beneath the fence, after digging the farrows for the flange portions, and extended to the exact distance between the posts. The flanges may then be covered with earth, and left. This is considerably simpler than laying a plurality of interlocking concrete members, which requires substantially exact spacing between the posts. Another important advantage of the fence trim guard of my invention is that the guard members may be extruded from relatively inexpensive plastic. The extruded sections need only be perforated and slotted, which may be done automatically.

Other advantages and meritorious features will more fully appear from the following specification, claims, and accompanying drawings, wherein:

FIG. 1 is a top perspective view of a guard member of this invention;

FIG. 2 is a side perspective view of one embodiment of the fence trim guard of this invention;

FIG. 3 is an end cross sectional view of the fence trim guard shown in FIG. 2; and FIG. 4 is a top view of one portion of the trim guard shown in FIGS. 2 and 3.

DESCRIPTION OF THE PREFERRED EMBODIMENTS

The preferred embodiment of the fence trim guard of this invention includes a plurality of guard members 20, shown in FIG. 1. The guard members include a substantially imperforate longitudinal channel portion 22 adapted to overlie the ground 24 between the fence posts, as shown in phantom at 26 in FIG. 3. The upper portion 28 of the channel portion is preferably flat, to lie flush with the ground and prevent the growth of grass, weeds and other vegetation beneath the fence.

The opposed lateral edges 30 of the channel portion extend downwardly, and terminate in opposed outwardly extending lateral flanges 32, adapted to be received beneath the ground and anchor the channel portion 22 in position. The lateral flanges preferably include a plurality of spaced apertures 34 which permit the growth of grass therethrough, as shown in FIG. 3. And, the lateral edges 30 of the channel portion may be disposed at an acute angle inwardly, toward the axis of the longitudinal channel, to add rigidity to the channel, flexibility to the lateral flanges 32, and provide a clear line of demarcation for the growth of vegetation, as shown in FIG. 3.

One end 36 of this embodiment of the guard member is substantially flat, and the opposite end includes an axial slot 38, terminating in a circular edge, adapted to receive a fence post 26, as shown in FIG. 2. The fence trim guard of this invention preferably includes two axially aligned, telescopically interlocking guard members 20 and 21, between each pair of adjacent fence posts 26. The guard members may each be identical to the guard member shown in FIG. 1, except that the channel portion of guard member 21 may be slightly larger to permit telescopic receipt of guard member 20.

The fence trim guard is installed by telescopically interlocking two guard members, with the fence post receiving slots 38 disposed at opposite ends of the assembly. The lateral flange portions 32 are received in longitudinal farrows dug on opposite sides of the posts, in line with the fence. The guard members 20 and 21 are then telescopically extended to receive the fence posts 26 in the slots 38, as shown in FIG. 2, between the fence posts 26. In the preferred embodiment of the invention, the slots 38 extend longitudinally through the end of the channel portion and terminate in an edge configured to complement the surface of the fence post, which is round in this embodiment. The opposed ends 30 of the guard members may therefore telescopically overlap at the fence posts, as shown in FIG. 4, to prevent the growth of vegetation at the posts. The lateral flange portions are then covered with earth, anchoring the channel portion in position, as shown in FIG. 3.

It will be understood by those skilled in the art that the fence trim guard of my invention may be formed of various materials including plastics, aluminum, and various metal alloys. A distinct advantage of the fence trim guard of my invention, over the prior art, is however that the guard members may be extruded from various plastics or aluminum, with very little secondary operations. The apertures 34 may be formed continuously and automatically at the extruding station. A flexible material may also be preferable to permit the guard members to conform to the irregularities in the ground between the fence posts. It is also preferable to use a material which is not subject to corrosion or deterioration. A suitable, relatively inexpensive plastic, such as polyethylene, could therefore be used.

What is claimed is:

1. A fence trim guard, including a guard member having a substantially imperforate longitudinal channel portion adapted to overlie the ground directly beneath the fence in line with the fence posts and prevent the growth of vegetation, said channel portion having opposed downwardly extending lateral edge portions terminating in outwardly extending lateral flange portions adapted to be received beneath the ground and anchor the channel portion in position beneath the fence, said lateral flange portions including a plurality of spaced apertures permitting growth of vegetation therethrough.

2. The fence trim guard defined in claim 1, characterized in that said lateral edge portions taper inwardly, toward the axis of said longitudinal channel portion.

3. The fence trim guard defined in claim 1, characterized in that one end of said longitudinal channel portion includes a slot adapted to receive a fence post, and the opposite end is substantially flat.

4. The fence trim guard defined in claim 1, characterized in that said trim guard includes two axially aligned telescopically interlocking guard members, said guard members telescopically adjustable to vary the combined length to the distance between adjacent fence posts.

5. The fence trim guard defined in claim 4, characterized in that each of said guard members includes a slot through one end adapted to receive a fence post.

6. The fence trim guard defined in claim 5, characterized in that the end of each guard member telescopically receiving the other guard member is substantially flat, and the opposite end includes the slot.

7. The fence trim guard defined in claim 5, characterized in that the slots terminate in a circular opening, such that the adjacent guard members telescopically overlap at the posts.

8. The fence trim guard defined in claim 1, characterized in that said guard members are formed of a flexible plastic resistant to deterioration.

9. The fence trim guard defined in claim 1, characterized in that the upper portion of said channel portion is substantially planar to lie flush with the ground.

References Cited

UNITED STATES PATENTS

| | | | |
|---|---|---|---|
| 129,665 | 7/1872 | Howard | 160—372 |
| 598,409 | 2/1898 | Bliss et al. | 160—39 |
| 1,257,768 | 2/1918 | Turner et al. | |
| 2,662,343 | 12/1953 | Rice | 47—33 |
| 2,782,561 | 2/1957 | Smith | 47—33 X |
| 3,384,351 | 5/1968 | Turner | 256—32 |
| 3,393,897 | 7/1968 | Wright | 256—32 |

DENNIS L. TAYLOR, Primary Examiner

U.S. Cl. X.R.

47—33; 52—102; 256—1